United States Patent
DeFelice et al.

(10) Patent No.: US 12,337,951 B2
(45) Date of Patent: Jun. 24, 2025

(54) SINGLE BUSHING SUPPORTED PNEUMATIC ACTUATORS

(71) Applicant: Hamilton Sundstrand Corporation, Charlotte, NC (US)

(72) Inventors: Robert DeFelice, South Windsor, CT (US); Maciej Luczynski, Wroclaw (PL)

(73) Assignee: Hamilton Sundstrand Corporation, Charlotte, NC (US)

( * ) Notice: Subject to any disclaimer, the term of this patent is extended or adjusted under 35 U.S.C. 154(b) by 156 days.

(21) Appl. No.: 18/087,711

(22) Filed: Dec. 22, 2022

(65) Prior Publication Data

US 2024/0208640 A1    Jun. 27, 2024

(51) Int. Cl.
*B64C 13/48* (2006.01)

(52) U.S. Cl.
CPC .................................. *B64C 13/48* (2013.01)

(58) Field of Classification Search
CPC ..................................................... B64C 13/48
See application file for complete search history.

(56) References Cited

U.S. PATENT DOCUMENTS

| RE29,253 E | 6/1977 | Daghe et al. |
| 6,886,546 B1 | 5/2005 | Bircann et al. |
| 10,088,056 B2 | 10/2018 | McAuliffe et al. |

FOREIGN PATENT DOCUMENTS

| DE | 3021717 A1 | 12/1980 |
| JP | 2000249107 A | * 9/2000 |
| JP | 2016017618 A | * 2/2016 |

OTHER PUBLICATIONS

Extended European Search Report for EP Application No. 23219301.1, Dated May 29, 2024, pp. 10.

* cited by examiner

*Primary Examiner* — Justin M Benedik
(74) *Attorney, Agent, or Firm* — Kinney & Lange, P.A.

(57) ABSTRACT

A pneumatic actuator can include a housing and an actuator shaft disposed within the housing and configured to actuate between a first position and a second position. The pneumatic actuator can include a single bushing located within the housing between the housing and the actuator shaft. The single bushing can be configured to support the actuator shaft without the actuator shaft being supported at a second location while allowing actuator motion under set operating conditions.

19 Claims, 4 Drawing Sheets

SINGLE BUSHING SUPPORTED PNEUMATIC ACTUATORS

FIELD

This disclosure relates to pneumatic actuators.

BACKGROUND

A pneumatic butterfly valve is often controlled by an integral pneumatic actuator which forces a linkage to turn a crank around the valve shaft. The crank cavity can be fluidly separated from the actuator. A slotted crank can be used in such instances, for example. In traditional slotted crank applications, the actuator shaft is supported by two bushings. There is a need to have a slotted crank actuator be capable of fitting within a smaller envelope than those legacy applications.

Such conventional methods and systems have generally been considered satisfactory for their intended purpose. However, there is still a need in the art for improvements. The present disclosure provides a solution for this need.

SUMMARY

A pneumatic actuator can include a housing and an actuator shaft disposed within the housing and configured to actuate between a first position and a second position. The pneumatic actuator can include a single bushing located within the housing between the housing and the actuator shaft. The single bushing can be configured to support the actuator shaft without the actuator shaft being supported at a second location while allowing actuator motion under set operating conditions.

The actuator shaft can include a pneumatic cup at a first end, and a drive connection assembly at a second end. The bushing can include a length to diameter ratio of greater than 1. For example, the length to diameter ratio can be between 2 and 3.

In certain embodiments, an inner diameter of the bushing can be the same or about the same as an outer diameter of the actuator shaft. In certain embodiments, the bushing can have a length of about a third of the shaft length.

In certain embodiments, the actuator can include a slotted crank assembly having a slot and connected to the connection assembly at the slot. In such embodiments, a length of an inner diameter of the bushing that contacts the actuator shaft can be defined by $x_2-x_1$, which can be solved for using an actuator force equation. The actuator force equation can be:

$$F_{ACT} = F_{CR} \frac{\left(x_1 + \mu_1 \frac{D_1}{2}\right)(\mu_2 \cos\alpha - \sin\alpha) + \left(x_2 + \mu_2 \frac{D_2}{2}\right)(\sin\alpha + \mu_1 \cos\alpha)}{x_2 + \mu_2 \frac{D_2}{2} - x_1 - \mu_1 \frac{D_1}{2}}$$

where $F_{ACT}$ is actuator force, $F_{CR}$ is crank force, $\mu_1$ is a first friction coefficient of the bushing, $\mu_2$ is a second friction coefficient of the bushing, $D_1$ is a first inner diameter of the bushing, $D_2$ is a second inner diameter of the bushing, $\alpha$ is the crank angle, $x_1$ is a distance from a crank point to a first contact point, and $x_2$ is a distance from a crank point to a second contact point. In certain embodiments, the actuator force $F_{ACT}$ can be constrained to be within an operating force range of the actuator shaft (e.g., a known amount of force that will be applied), $\mu_1=\mu_2$, and $D_1=D_2$ which equal an outer diameter of the actuator shaft, such that $x_2-x_1$ is determinable to result in actuator shaft motion in operation (e.g., the actuator will not cause shaft tilt and/or frictional forces that overcome the input actuator force $F_{ACT}$).

In accordance with at least one aspect of this disclosure, an aircraft pneumatic system can include a pneumatic actuator. The pneumatic actuator can be any suitable actuator disclosed herein, e.g., as described above.

In accordance with at least one aspect of this disclosure, a method can include constructing a pneumatic actuator to have a single bushing for an actuator shaft that actuates a slotted crank. The method can include selecting dimensions of the bushing to allow actuation of the actuator shaft under a set operating actuator force.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
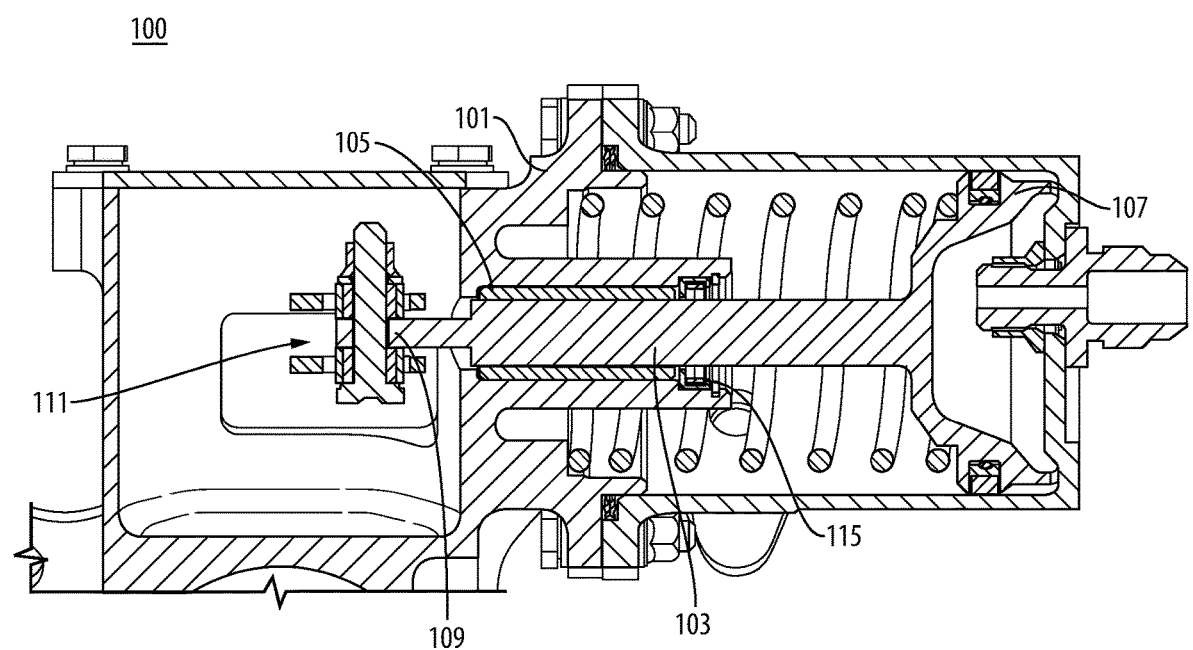
FIG. 1 is a cross-sectional view of an embodiment of a pneumatic actuator in accordance with this disclosure, showing a link pin connection.
Figure 2:
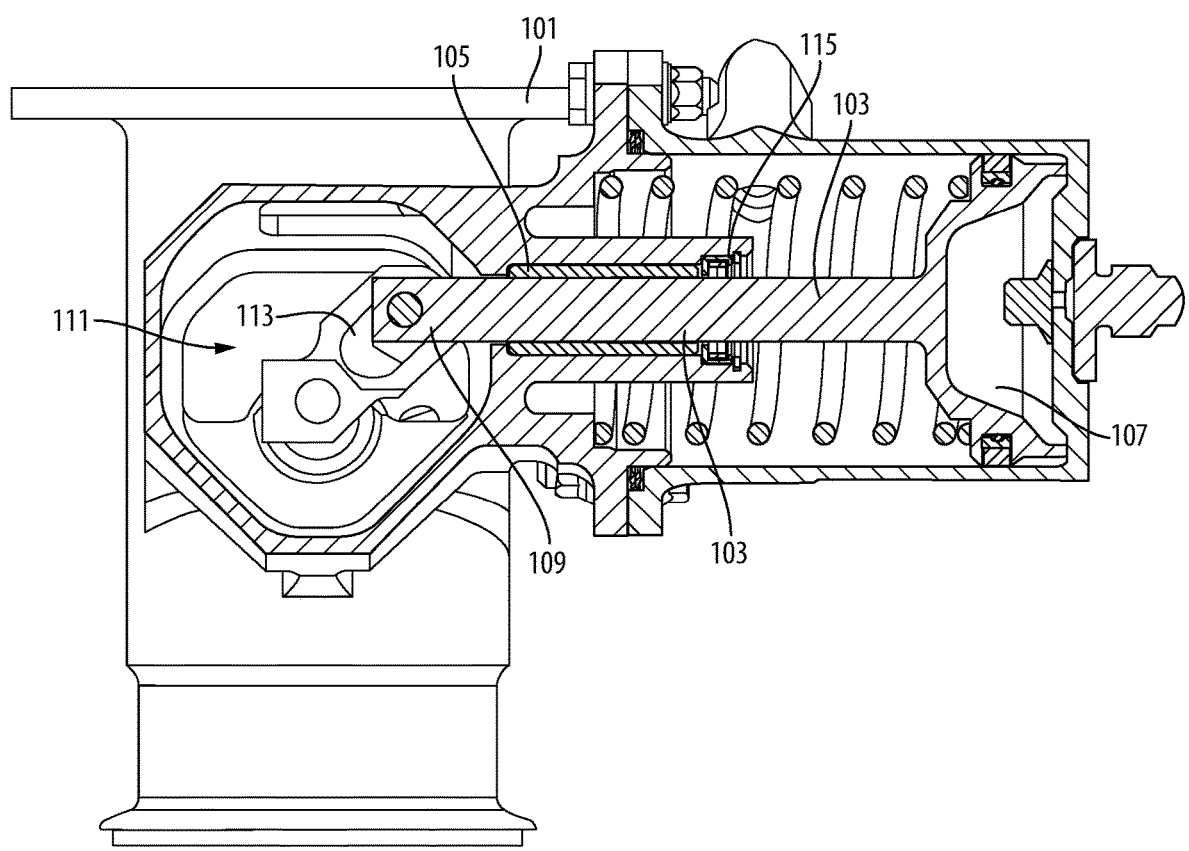
FIG. 2 is an orthogonal cross-sectional view of the embodiment of FIG. 1, showing a slotted crank assembly.
Figure 3:
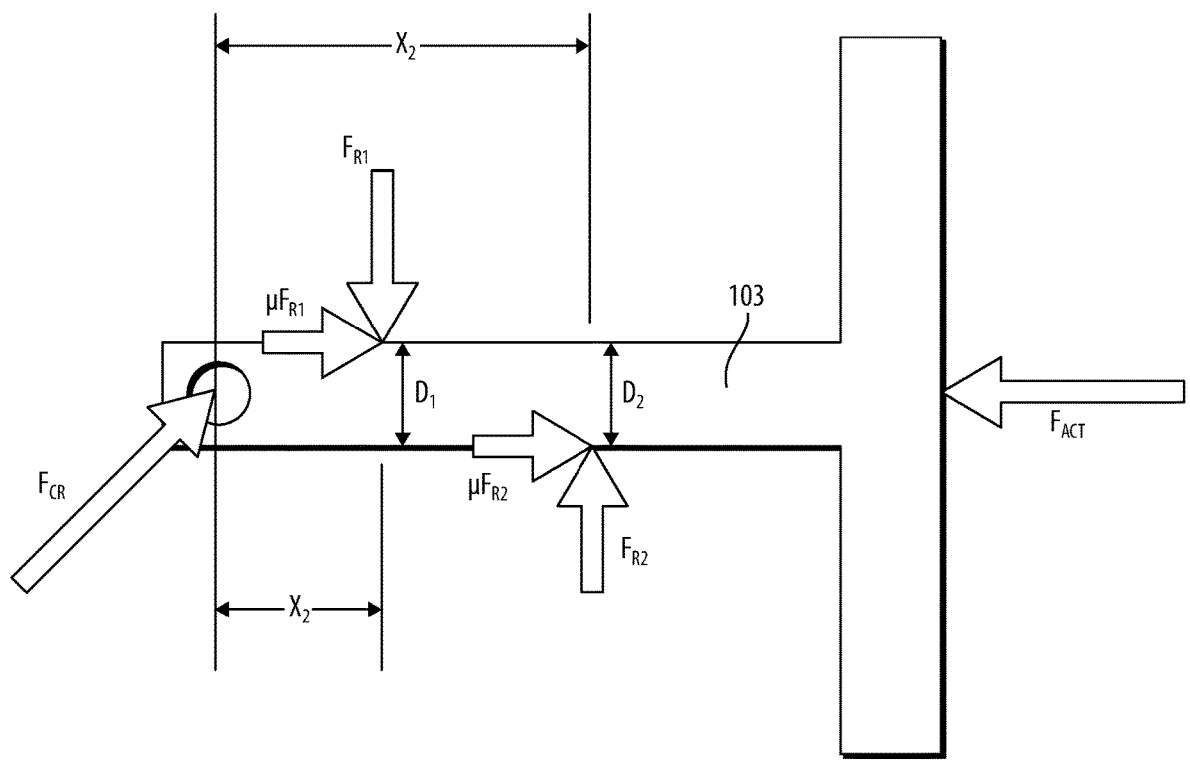
FIG. 3 is a free body diagram of an actuation shaft in accordance with this disclosure, e.g., as shown in FIG. 2.
Figure 4:
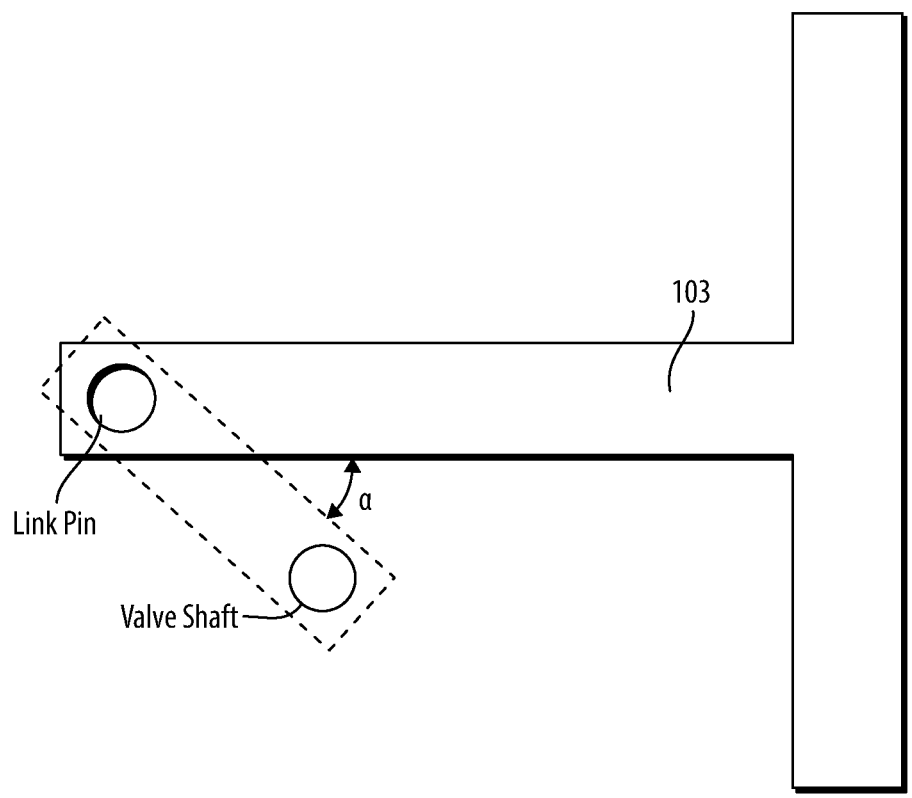
FIG. 4 illustrates a crank angle on the free body diagram of FIG. 3.

Reference will now be made to the drawings wherein like reference numerals identify similar structural features or aspects of the subject disclosure. For purposes of explanation and illustration, and not limitation, an illustrative view of an embodiment of a pneumatic actuator in accordance with the disclosure is shown in FIG. 1 and is designated generally by reference character 100. Other embodiments and/or aspects of this disclosure are shown in FIGS. 2-4. Certain embodiments described herein can be used to reduce a size and weight of an actuator assembly, for example.

Referring to FIGS. 1 and 2, a pneumatic actuator 100 can include a housing 101 and an actuator shaft 103 disposed within the housing 101 and configured to actuate between a first position (e.g., as shown having the actuator shaft 103 in a right most position) and a second position (e.g., wherein the actuator shaft 103 is slid to the left most position). The pneumatic actuator 100 can include a single bushing 105 located within the housing 101 between the housing 101 and the actuator shaft 103. The single bushing 105 can be configured to support the actuator shaft 103 without the actuator shaft 103 being supported at a second location while allowing actuator motion under set operating conditions (e.g., known pneumatic force limitations).

The actuator shaft 103 can include a pneumatic cup 107 at a first end, and a drive connection assembly 109 at a second end. The actuator shaft 103 can have a straight portion between the pneumatic cup and the connection assembly 109, for example. While an embodiment is shown, other suitable actuator shaft shapes are contemplated herein.

The single bushing 105 can include a tube shape, e.g., as shown. The single bushing 105 can have flat ends and/or one or more beveled or chamfered ends. The length of the single bushing 105 can be considered to be the length of the inner diameter (e.g., a shaft contact surface) of the single bushing 105. The single bushing 105 can be made of any suitable material (e.g., hard plastic, metal, alloy, composite, ceramic, etc.) that provides a desirable frictional force that allows the actuator shaft 103 to slide therein.

The single bushing 105 can include a length to diameter ratio of greater than 1. For example, the length to diameter ratio can be between 2 and 3. In certain embodiments, an inner diameter of the bushing 105 can be the same or about the same as an outer diameter of the actuator shaft 103. In certain embodiments, the bushing 105 can have a length of about a third of the shaft length (e.g., as shown).

In certain embodiments, the actuator 100 can include a slotted crank assembly 111 having a slot 113 and connected to the connection assembly 109 at the slot 113. In such embodiments, referring additionally to FIGS. 3 and 4, a length of an inner diameter of the bushing 105 that contacts the actuator shaft 103 can be defined by the distance $x_2-x_1$, which can be solved for using an actuator force equation. The actuator force equation can be:

$$F_{ACT} = F_{CR} \frac{\left(x_1 + \mu_1 \frac{D_1}{2}\right)(\mu_2 \cos\alpha - \sin\alpha) + \left(x_2 + \mu_2 \frac{D_2}{2}\right)(\sin\alpha + \mu_1 \cos\alpha)}{x_2 + \mu_2 \frac{D_2}{2} - x_1 - \mu_1 \frac{D_1}{2}}$$

where $F_{ACT}$ is actuator force, $F_{CR}$ is crank force, $\mu_1$ is a first friction coefficient of the bushing 105, $\mu_2$ is a second friction coefficient of the bushing 105, $D_1$ is a first inner diameter of the bushing, $D_2$ is a second inner diameter of the bushing, $\alpha$ is the crank angle, $x_1$ is a distance from a crank point to a first contact point (shown where $F_{R1}$ is applied), and $x_2$ is a distance from a crank point to a second contact point (shown where $F_{R2}$ is applied). In certain embodiments, the actuator force $F_{ACT}$ can be constrained to be within an operating force range of the actuator shaft (e.g., a known amount of force that will be applied), $\mu_1$ can equal $\mu_2$ (e.g., because the friction coefficient along the bushing 105 can be constant), and $D_1$ can equal $D_2$ (inner diameter can be constant) which equal an outer diameter of the actuator shaft 105 (e.g., within 1%), such that the distance $x_2-x_1$ is determinable to result in actuator shaft motion in operation (e.g., the actuator 100 will not cause shaft tilt and/or frictional forces that overcome the input actuator force $F_{ACT}$). Further derivation of the above noted force equation is described below. The term $x_1$ can be descried as the closest-to-crank edge of the innermost diameter of the bushing 105. The term $x_2$ can be described as the contact point opposite $x_1$, e.g., the furthest-from-crank edge of the innermost diameter of the bushing 105. Depending on taper of the bushing 105 at the edges, this could be the very edge of the bushing 105. The crank angle alpha is known at different positions based on the desired arrangement. The maximum $x_1/x_2$ positions can be determined by setting the actuator force $F_{ACT}$ to operating force for pushing the actuator shaft.

In accordance with at least one aspect of this disclosure, an aircraft pneumatic system can include a pneumatic actuator. The pneumatic actuator can be any suitable actuator disclosed herein, e.g., actuator 100 as described above.

In accordance with at least one aspect of this disclosure, a method can include constructing a pneumatic actuator 100 to have a single bushing 105 for an actuator shaft 103 that actuates a slotted crank 111. The method can include selecting dimensions of the bushing 105 to allow actuation of the actuator shaft 103 under a set operating actuator force (e.g., while preventing tilt and following full motion of the slotted crank 111).

Traditionally, systems have always needed two points for bushings for slotted cranks to function. This is because the shaft would otherwise tilt and jam the system due to frictional forces. In such cases, the shaft would have to be extended in length (e.g., through and beyond the crank assembly location) to another point where another bushing was located. Embodiments utilize a single bushing positioned and sized to ensure operation at the desired actuator forces, which reduces the size and weight of the device.

Embodiments can maximize the length of bushing relative to shaft while accounting for frictional loads due to moment from the angle of the slotted crank. Embodiments are scalable to result in any suitable size of bushing needed for any suitable application. Embodiments use just one bushing for shaft support (e.g., centrally located within the housing). Embodiments can utilize fewer parts (less cost), and have a smaller envelope.

Embodiments can be formulated utilizing new terms added to an actuator force calculation, e.g., as described below. Embodiments can include a slotted crank that eliminates the need for an intermediate link connecting the piston (e.g., the actuator shaft) and crank assembly, which can also allow for sealing between actuator and crank cavities (e.g., via a seal 115 as shown right of the bushing 105). Thus the actuator shaft 103 (e.g., also referred to as a piston) can be a single piece that can be sealed to the housing 101 with the seal 115.

Embodiments of a bushing can be designed to account for all force margin terms, which can eliminate the need for second bushing (e.g., which can provide less weight, cost, and envelope). Embodiments can utilize a close fit (e.g., approximately ANSI B4.1 RC5 or tighter fit). For example, the bushing can be drilled out to almost the exact desired size to minimize clearance (e.g., to make the inner diameter of the bushing as close to D1/D2 in the equations below). The clearance can be selected to at least prevent shaft tipping within the bushing, which can amount to a tolerance of about 1% of shaft diameter, for example. Embodiments can include a piston rod seal that enables the crank to be in different environment than the pneumatic portion of the actuator shaft, which can enhance reliability.

The end of the shaft which interfaces with the crank can do so via a pin with rollers, so no moment can be transmitted. FIG. 3 shows a simplified piston free body diagram of the provided actuator example with the Crank connection on the left. The net actuator force needed to balance the crank force is denoted as $F_{ACT}$. In this free body diagram:

$$F_{CR,X} = F_{CR}\sin\alpha$$

$$F_{CR,Y} = F_{CR}\cos\alpha$$

where $\alpha$ is the angle between the Crank and Actuator centerlines, as shown in FIG. 4 and used in in the below equations:

$$\sum F_y = 0 = F_{CR,Y} - F_{R1} + F_{R2}$$

$$F_{R1} = F_{CR}\cos\alpha + F_{R2}$$

$$\sum F_x = 0 = F_{CR,X} + \mu_1 F_{R1} + \mu_2 F_{R2} - F_{ACT}$$

$$\mu_2 F_{R2} = F_{ACT} - F_{CR}\sin\alpha - \mu_1 F_{R1}$$

$$\mu_2 F_{R2} = F_{ACT} - F_{CR}\sin\alpha - \mu_1 (F_{CR}\cos\alpha + F_{R2})$$

$$\mu_2 F_{R2} = F_{ACT} - F_{CR}\sin\alpha - \mu_1 F_{CR}\cos\alpha - \mu_1 F_{R2}$$

$$\mu_2 F_{R2} + \mu_1 F_{R2} = F_{ACT} - F_{CR}\sin\alpha - \mu_1 F_{CR}\cos\alpha$$

$$F_{R2} = \frac{1}{\mu_1 + \mu_2} F_{ACT} - \frac{1}{\mu_1 + \mu_2} F_{CR}\sin\alpha - \frac{\mu_1}{\mu_1 + \mu_2} F_{CR}\cos\alpha$$

Substituting this result into the earlier equation yields:

$$F_{R1} = F_{CR}\cos\alpha + \frac{1}{\mu_1 + \mu_2} F_{ACT} - \frac{1}{\mu_1 + \mu_2} F_{CR}\sin\alpha - \frac{\mu_1}{\mu_1 + \mu_2} F_{CR}\cos\alpha$$

$$\sum M = 0 = -F_{R1} x_1 - \mu_1 F_{R1} \frac{D_1}{2} + F_{R2} x_2 + \mu_2 F_{R2} \frac{D_2}{2}$$

$$0 = \left(x_1 + \mu_1 \frac{D_1}{2}\right)(-F_{R1}) + \left(x_2 + \mu_2 \frac{D_2}{2}\right)(F_{R2})$$

$$0 = \left(x_1 + \mu_1 \frac{D_1}{2}\right)$$

$$\left(-F_{CR}\cos\alpha - \frac{1}{\mu_1 + \mu_2} F_{ACT} + \frac{1}{\mu_1 + \mu_2} F_{CR}\sin\alpha + \frac{\mu_1}{\mu_1 + \mu_2} F_{CR}\cos\alpha\right) +$$

$$\left(x_2 + \mu_2 \frac{D_2}{2}\right)\left(\frac{1}{\mu_1 + \mu_2} F_{ACT} - \frac{1}{\mu_1 + \mu_2} F_{CR}\sin\alpha - \frac{\mu_1}{\mu_1 + \mu_2} F_{CR}\cos\alpha\right)$$

$$0 = \left(x_1 + \mu_1 \frac{D_1}{2}\right)[-(\mu_1 + \mu_2) F_{CR}\cos\alpha - F_{ACT} + F_{CR}\sin\alpha + \mu_1 F_{CR}\cos\alpha] +$$

$$\left(x_2 + \mu_2 \frac{D_2}{2}\right)(F_{ACT} - F_{CR}\sin\alpha - \mu_1 F_{CR}\cos\alpha)$$

$$0 = \left(x_1 + \mu_1 \frac{D_1}{2}\right)(-\mu_2 F_{CR}\cos\alpha - F_{ACT} + F_{CR}\sin\alpha) +$$

$$\left(x_2 + \mu_2 \frac{D_2}{2}\right)(F_{ACT} - F_{CR}\sin\alpha - \mu_1 F_{CR}\cos\alpha)$$

$$\left(x_1 + \mu_1 \frac{D_1}{2}\right)(\mu_2 F_{CR}\cos\alpha - F_{CR}\sin\alpha) +$$

$$\left(x_2 + \mu_2 \frac{D_2}{2}\right)(F_{CR}\sin\alpha + \mu_1 F_{CR}\cos\alpha) =$$

$$\left(x_1 + \mu_1 \frac{D_1}{2}\right)(-F_{ACT}) + \left(x_2 + \mu_2 \frac{D_2}{2}\right)(F_{ACT})$$

$$F_{CR}\left[\left(x_1 + \mu_1 \frac{D_1}{2}\right)(\mu_2\cos\alpha - \sin\alpha) + \left(x_2 + \mu_2 \frac{D_2}{2}\right)(\sin\alpha + \mu_1\cos\alpha)\right] =$$

$$F_{ACT}\left[-\left(x_1 + \mu_1 \frac{D_1}{2}\right) + \left(x_2 + \mu_2 \frac{D_2}{2}\right)\right]$$

$$F_{ACT} = F_{CR} \frac{\left(x_1 + \mu_1 \frac{D_1}{2}\right)(\mu_2\cos\alpha - \sin\alpha) + \left(x_2 + \mu_2 \frac{D_2}{2}\right)(\sin\alpha + \mu_1\cos\alpha)}{x_2 + \mu_2 \frac{D_2}{2} - x_1 - \mu_1 \frac{D_1}{2}}$$

The crank force is now be determined to make use of this relationship.

$$T_{CR} = F_{CR} L_{ARM} =$$

$$T_{F,THRUST} + T_{AERO} + T_{FB,DISC} + T_{F,DR} + T_{FB,CR} + T_{F,PIN} + T_{F,SEAL}$$

$T_{CR}$: Torque applied to Crank

-continued $T_{F,THRUST}$: Torque due to shaft thrust load $T_{FB,DISC}$: Torque due bushing friction from disc pressure load $T_{F,DR}$: Torque due to disc ring friction $T_{FB,CR}$: Torque due to bushing friction from actuator load $T_{F,PIN}$: Torque due to pin friction $T_{F,SEAL}$: Torque due to friction of seal between flow path and crank cavity However, it is noted that $T_{FB,CR}$ and $T_{F,PIN}$ are functions of the crank force:

$$T_{FB,CR} = F_{CR} \mu_{BUSH} \frac{D_{SHAFT}}{2}$$

$$T_{F,PIN} = F_{CR} \mu_{PIN} \frac{D_{PIN}}{2}$$

$$F_{CR} L_{ARM} =$$

$$T_{F,THRUST} + T_{AERO} + T_{FB,DISC} + T_{F,DR} + F_{CR}\mu_B \frac{D_S}{2} + F_{CR}\mu_P \frac{D_P}{2} + T_{F,SEAL}$$

$$F_{CR}\left(L_{ARM} - \mu_B \frac{D_S}{2} - \mu_P \frac{D_P}{2}\right) =$$

$$T_{F,THRUST} + T_{AERO} + T_{FB,DISC} + T_{F,DR} + T_{F,SEAL}$$

$$F_{CR} = \frac{T_{F,THRUST} + T_{AERO} + T_{FB,DISC} + T_{F,DR} + T_{F,SEAL}}{L_{ARM} - \mu_B \frac{D_S}{2} - \mu_P \frac{D_P}{2}}$$

Thus, the procedure to determine the actuator load at a given condition would be:
Determine Crank force using:

$$F_{CR} = \frac{T_{F,THRUST} + T_{AERO} + T_{FB,DISC} + T_{F,DR} + T_{F,SEAL}}{L_{ARM} - \mu_B \frac{D_S}{2} - \mu_P \frac{D_P}{2}}$$

Determine Actuator force using:

$$F_{ACT} = F_{CR} \frac{\left(x_1 + \mu_1 \frac{D_1}{2}\right)(\mu_2\cos\alpha - \sin\alpha) + \left(x_2 + \mu_2 \frac{D_2}{2}\right)(\sin\alpha + \mu_1\cos\alpha)}{x_2 + \mu_2 \frac{D_2}{2} - x_1 - \mu_1 \frac{D_1}{2}}$$

This represents the load where the actuator is in force balance, so any actuator load above this would be margin for the actuator. Other uncertainty factors for unknown loads such as friction and aero torque can be added to the equation, for example, if desired.

Embodiments include an actuator which has a slotted crank and central support bushing, allowing for linear motion of the piston to be translated to rotational motion of a crank in a separate cavity from the actuator. The two cavities can be sealed relative to one another so that the crank cavity can be in a more controlled environment than that of actuator muscle air. The force margin of this actuator style can be sensitive to certain parameters like the length of the bushing providing piston support. Such considerations for force margin of the actuator are disclosed herein. Embodiments can be smaller than legacy devices, resulting in reducing envelope, cost, weight, and number of parts.

Embodiments also separate the actuator from the crank cavity with a piston shaft seal 115. Material wear resistance often degrades at elevated temperatures. For high temperature applications like bleed valves, wear in the crank cavity can cause premature valve failure. Separating these two chambers can improve reliability by allowing for the crank cavity to be in a cooler environment.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A pneumatic actuator, comprising:
    a housing forming both a crank cavity and an actuator cavity;
    an actuator shaft disposed within the housing and configured to actuate between a first position and a second position;
    a bushing located within the housing between the housing and the actuator shaft, wherein the bushing is between the crank cavity and the actuator cavity, and wherein the bushing is configured to support the actuator shaft without the actuator shaft being supported at a second location while allowing actuator motion under set operating conditions, wherein the bushing comprises a length to diameter ratio greater than 1;
    a shaft seal between the housing and the actuator shaft, wherein the shaft seal is between the crank cavity and the actuator cavity;
    a pneumatic cup connected to a first end of the actuator shaft, wherein the pneumatic cup is within the actuator cavity; and
    a drive connection assembly connected to a second end of the actuator shaft, wherein the drive connection assembly is within the crank cavity.

2. The actuator of claim 1, wherein the actuator shaft includes a pneumatic cup at a first end, and a drive connection assembly at a second end.

3. The actuator of claim 2, wherein the length to diameter ratio is between 2 and 3.

4. The actuator of claim 3, wherein an inner diameter of the bushing is the same or about the same as an outer diameter of the actuator shaft.

5. The actuator of claim 4, wherein the bushing has a length of about a third of the shaft length.

6. The actuator of claim 5, further comprising a slotted crank assembly having a slot and connected to the connection assembly at the slot.

7. The actuator of claim 6, wherein a length of an inner diameter of the bushing that contacts the actuator shaft defined by $x_2-x_1$, solved for using the actuator force equation:

$$F_{ACT} = F_{CR} \frac{\left(x_1 + \mu_1 \frac{D_1}{2}\right)(\mu_2 \cos\alpha - \sin\alpha) + \left(x_2 + \mu_2 \frac{D_2}{2}\right)(\sin\alpha + \mu_1 \cos\alpha)}{x_2 + \mu_2 \frac{D_2}{2} - x_1 - \mu_1 \frac{D_1}{2}}$$

where $F_{ACT}$ is actuator force, wherein For is crank force, $\mu_1$ is a first friction coefficient of the bushing, $\mu_2$ is a second friction coefficient of the bushing, $D_1$ is a first inner diameter of the bushing, $D_2$ is a second inner diameter of the bushing, a is the crank angle, $x_1$ is a distance from a crank point to a first contact point, and $x_2$ is a distance from a crank point to a second contact point.

8. The actuator of claim 7, wherein the actuator force $F_{ACT}$ is constrained to be within an operating force range of the actuator shaft, $\mu_1=\mu_2$, and $D_1=D_2$ which equal an outer diameter of the actuator shaft, such that $x_2-x_1$ is determinable to result in actuator shaft motion in operation.

9. An aircraft pneumatic system, comprising:
    a pneumatic actuator, comprising:
        a housing forming both a crank cavity and an actuator cavity;

an actuator shaft disposed within the housing and configured to actuate between a first position and a second position;

a bushing located within the housing between the housing and the actuator shaft, wherein the bushing is between the crank cavity and the actuator cavity, wherein the bushing is configured to support the actuator shaft without the actuator shaft being supported at a second location while allowing actuator motion under set operating conditions, and wherein the bushing has a length to diameter ratio greater than 1; and a shaft seal between the housing and the actuator shaft, wherein the shaft seal is between the crank cavity and the actuator cavity.

10. The actuator of claim 9, wherein the actuator shaft includes a pneumatic cup at a first end of the actuator shaft and within the actuator cavity, and a drive connection assembly at a second end of the actuator shaft and within the crank cavity.

11. The actuator of claim 10, wherein the bushing includes a length to diameter ratio of greater than 1.

12. The actuator of claim 11, wherein the length to diameter ratio is between 2 and 3.

13. The actuator of claim 12, wherein an inner diameter of the bushing is the same or about the same as an outer diameter of the actuator shaft.

14. The actuator of claim 13, wherein the bushing has a length of about a third of the shaft length.

15. The actuator of claim 14, further comprising a slotted crank assembly having a slot and connected to the connection assembly at the slot.

16. The actuator of claim 15, wherein a length of an inner diameter of the bushing that contacts the actuator shaft defined by $x_2-x_1$, solved for using the actuator force equation:

$$F_{ACT} = F_{CR} \frac{\left(x_1 + \mu_1 \frac{D_1}{2}\right)(\mu_2 \cos\alpha - \sin\alpha) + \left(x_2 + \mu_2 \frac{D_2}{2}\right)(\sin\alpha + \mu_1 \cos\alpha)}{x_2 + \mu_2 \frac{D_2}{2} - x_1 - \mu_1 \frac{D_1}{2}}$$

where $F_{ACT}$ is actuator force, wherein Fcr is crank force, $\mu_1$ is a first friction coefficient of the bushing, $\mu_2$ is a second friction coefficient of the bushing, $D_1$ is a first inner diameter of the bushing, $D_2$ is a second inner diameter of the bushing, a is the crank angle, $x_1$ is a distance from a crank point to a first contact point, and $x_2$ is a distance from a crank point to a second contact point.

17. The actuator of claim 16, wherein the actuator force $F_{ACT}$ is constrained to be within an operating force range of the actuator shaft, $\mu_1=\mu_2$, and $D_1=D_2$ which equal an outer diameter of the actuator shaft, such that $x_2-x_1$ is determinable to result in actuator shaft motion in operation.

18. A pneumatic actuator, comprising:
a housing comprising:
a crank cavity;
an actuator cavity;
a partition wall between the crank cavity and the actuator cavity; and
a support tube formed on the partition wall and extending from the partition wall into the actuator cavity;
an actuator shaft disposed within the housing and extending from the actuator cavity to the crank cavity through the support tube, wherein the actuator shaft comprises:
a pneumatic cup at a first end of the actuator shaft, wherein the pneumatic cup is in the actuator cavity; and
a drive connection assembly at a second end of the actuator shaft, wherein the drive connection assembly is in the crank cavity;
a bushing located within the support tube and between the actuator shaft and the support tube, and wherein the bushing comprises a length to diameter ratio greater than 1.

19. The pneumatic actuator of claim 18, further comprising:
a shaft seal between the actuator shaft and the support tube of the housing, and
wherein the shaft seal is between the crank cavity and the actuator cavity.

* * * * *